W. W. TERRIFF.
LEG LIFTING CASTER DEVICE FOR TUBS, &c.
APPLICATION FILED OCT. 6, 1909.
970,860.
Patented Sept. 20, 1910.
2 SHEETS—SHEET 1.
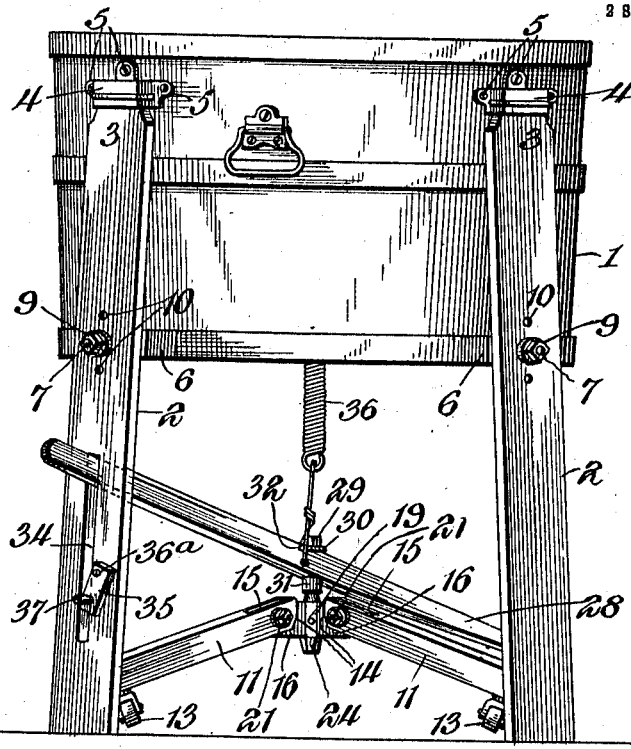
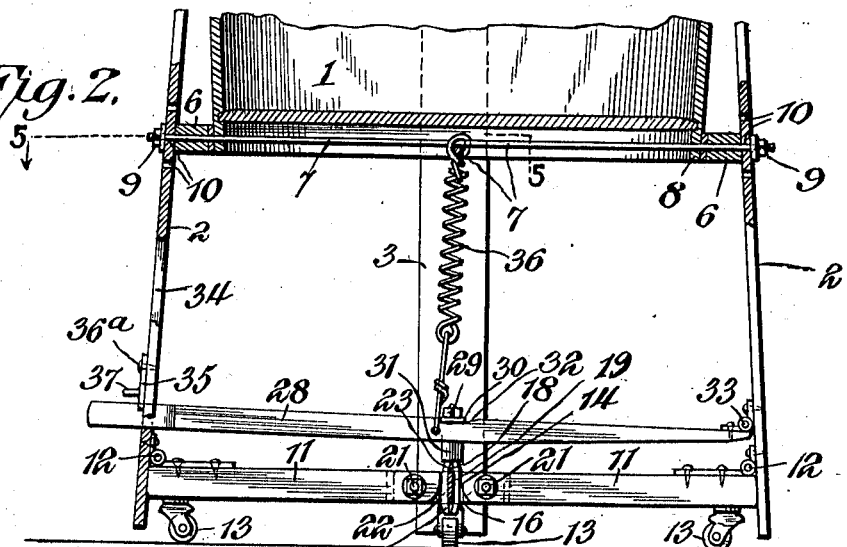
Witnesses
Jas. F. McCathran
H. F. Riley
William W. Terriff, Inventor
By E. G. Siggers, Attorney

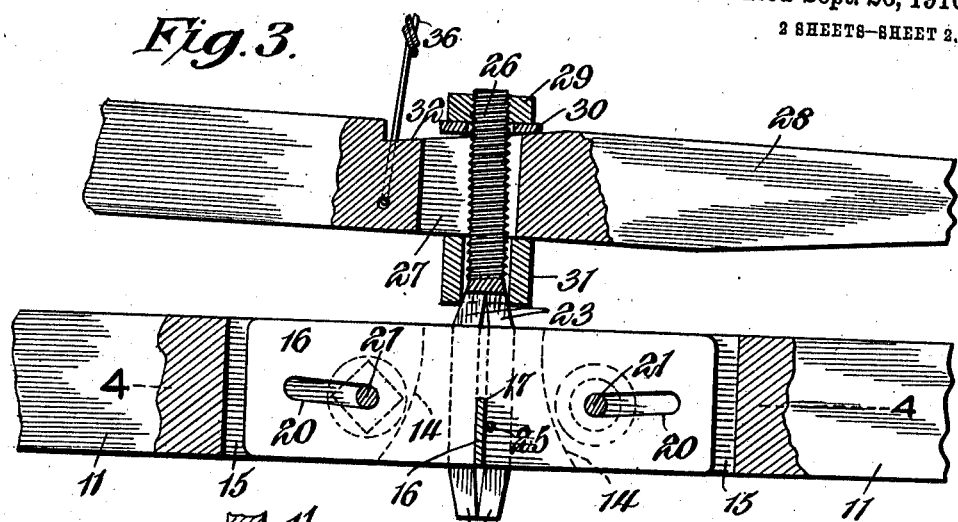
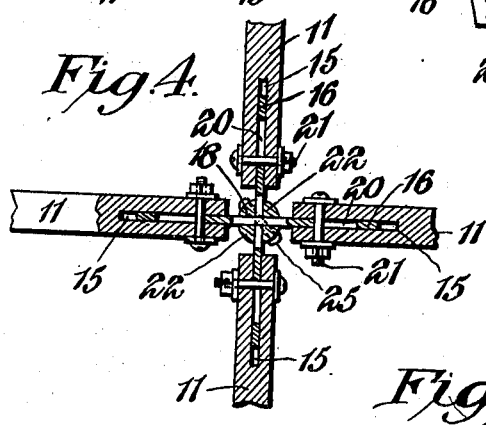
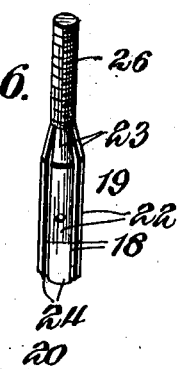
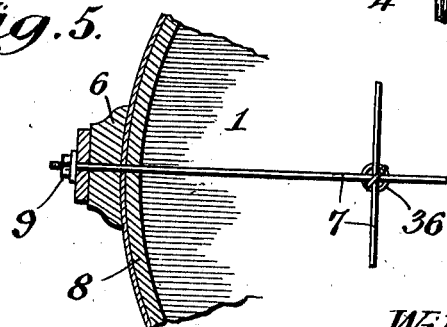
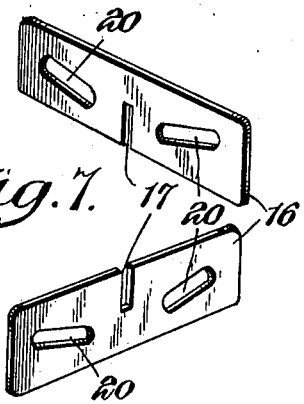

UNITED STATES PATENT OFFICE.

WILLIAM WALLACE TERRIFF, OF PORTLAND, MICHIGAN.

LEG-LIFTING CASTER DEVICE FOR TUBS, &c.

970,860.     Specification of Letters Patent.     Patented Sept. 20, 1910.

Application filed October 6, 1909. Serial No. 521,338.

*To all whom it may concern:*

Be it known that I, WILLIAM WALLACE TERRIFF, a citizen of the United States, residing at Portland, in the county of Ionia and State of Michigan, have invented a new and useful Leg-Lifting Caster Device for Tubs, &c., of which the following is a specification.

The invention relates to improvements in leg lifting devices for tubs, etc.

The object of the present invention is to improve the construction of leg lifting devices, and to provide a simple, inexpensive and efficient caster-carrying device, adapted to be readily operated to permit the legs of a tub, or other object to rest upon the supporting surface and to arrange the casters for supporting the tub to permit the same to be readily moved from one place to another.

Another object of the invention is to arrange the parts so that the device will connect and brace the legs at the lower ends thereof, when the legs are subjected to lateral strain incident to moving the tub from one place to another.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a washing machine tub, having a leg lifting device constructed in accordance with this invention. Fig. 2 is a vertical sectional view of the same. Fig. 3 is an enlarged detail sectional view, illustrating the construction for connecting the operating mechanism with the hinged caster-carrying bars. Fig. 4 is a horizontal sectional view on the line 4—4 of Fig. 3. Fig. 5 is a similar view on the line 5—5 of Fig. 2. Fig. 6 is a detail perspective view of the central pin or member. Fig. 7 is a detail view, illustrating the construction of the interlocking plates. Fig. 8 is a detail view of one of the sockets.

Like numerals of reference designate corresponding parts in all the figures of the drawings.

1 designates a washing machine tub, but the improvements herein shown and described may be applied to analogous receptacles. The tub is supported in an elevated position by legs 2, having their upper ends 3 reduced and fitted in metallic sockets 4. The metallic sockets, which preferably consist of castings, are open at the bottom and at the inner side, the tub constituting the inner wall of the socket, when the latter is applied to the same. The socket, which is oblong, is provided at the top and ends with ears 5, which are perforated for the reception of screws, or other suitable fastening devices for securing the socket to the receptacle. The legs are set at a slight inclination and extend upwardly and inwardly, being spaced from the tub at the bottom thereof by blocks 6, which may be constructed either of wood or metal. The intermediate portions of the legs are secured to the tub by horizontal rods 7, piercing the legs, the spacing blocks and the chime 8 of the tub and threaded at their outer ends for the reception of nuts 9, washers being interposed between the nuts and the legs. By this construction, the legs are rigidly fastened to the tub and there is no tendency of the legs to strain the tub and cause the latter to leak. The receptacle is provided at the bottom with an extended chime to receive the horizontal connecting rods, which are crossed below the bottom of the tub. The legs are provided with a plurality of perforations 10 to permit a vertical adjustment of the tub, which may be readily raised and lowered by placing the connecting rods in the different perforations and changing the position of the sockets to correspond with the position of the legs.

In order to enable the tub, when full or empty, to be readily moved from one place or point to another, it is equipped with a caster-carrying device comprising a plurality of radially arranged bars 11, connected at their outer ends with the legs adjacent to the lower ends thereof by hinges 12, and provided at their outer portions with casters 13, or other suitable anti-friction devices. The bars 11 are movable upwardly and downwardly, and the casters project below the lower ends of the legs when the bars are at the limit of their downward movement, as illustrated in Fig. 2 of the drawings. The tub is then supported by the casters and may be readily moved with little effort from one place to another. When the bars are swung upward, as shown in Fig. 1 of the drawings, the casters are lifted clear of the supporting surface and the lower ends of the legs rest thereon, so as to firmly support the tub in position for use. The hinges 12 are secured to the upper edges of the bars 11 and to the inner faces of the legs, and the outer ends of the bars abut against the inner faces of the legs, when the said bars are swung downward and when in this position, the bars are arranged horizontally and form braces for the lower ends of the legs when the latter are subjected to the lateral strain incident to moving the tub over a supporting surface.

The inner ends 14 of the bars are rounded adjacent to their lower edges, and they are provided with vertical longitudinal slots 15 for the reception of the outer portions of interlocked plates 16. The plates 16 are provided with central interfitting recesses 17, and are arranged in vertical intersecting slots 18 of a central pin or member 19 and they form projecting wings. The outer portions of the plates 16 are provided with inclined longitudinal slots 20 through which pass horizontal bolts 21, which pierce the inner slotted ends of the bars 11. The bolt and slot connection between the plates and the inner ends of the bars permit the necessary play of the parts when the bars are moved upward and downward. The lower portions of the central pin or member 19 is split by the said slots 18, which are diametrically arranged, as clearly shown in Fig. 4 of the drawings, to form lower spaced portions 22. The lower spaced portions 22 of the central pin 19 fit in the angles of the interlocked plates, and their upper and lower terminals 23 and 24 are inclined, as clearly shown in Fig. 3 of the drawings. The lower inclined terminals 24 abut and the plates 16 are rigidly secured between the spaced lower portions of the central pin by rivets 25, or other suitable fastening means.

The upper portion 26 of the central pin or member is threaded and extends through a slot 27 of an operating lever 28, and is provided at its upper end with a nut 29, a washer 30 being interposed between the nut and the upper edge of the operating lever. The operating lever is spaced from the bars 11 by a sleeve 31, interposed between the lower edge of the lever and the tapered portion formed by the upper terminals 23 of the spaced portions 22. The washer is seated in a recess 32 in the upper edge of the lever, and there is sufficient space between the washer and the sleeve to permit free movement of the lever in operating the caster-carrying device. The lever is fulcrumed at its inner end to the inner face of one of the legs by means of a hinge 33, and its outer end extends through a slot 34 of the opposite leg and is adapted to be engaged by a pivot latch 35, located adjacent to the lower portion of the slot and adapted to engage the upper edge of the lever, when the latter is moved downward to the lower end of the slot in the position illustrated in Fig. 2, of the drawings. The lever is connected at an intermediate point with the lower end of a coiled spring 36, which is secured at its upper end to the crossed rods 7 below the center of the tub. The spring operates to automatically lift the casters clear of the supporting surface when the operating lever is free to move upward. The latch 35 is eccentrically pivoted at its upper end by a screw 36ª, or other suitable fastening device, and it hangs in an inclined position with its lower end normally extending across the slot, so that when the lever is depressed by the foot of the operator, it will be automatically engaged by the latch. The lower portion of the latch is provided with a projection 37, adapted to permit the latch to be conveniently swung out of engagement with the operating lever.

Having thus fully described my invention, what I claim as new and desire to secure by Letters Patent, is:—

1. The combination with legs adapted to support a tub or other object, of bars movable upwardly and downwardly and connected with the lower portions of the legs and forming braces for the same, anti-friction devices carried by the bars, operating means connected with the inner portions of the bars, a latch for locking the bars at the limit of their downward movement, and a spring for automatically moving the bars upward.

2. The combination with legs adapted to support a tub or other object, of bars movable upwardly and downwardly and connected with the lower portions of the legs and forming braces for the same, anti-friction devices carried by the bars, a lever connected with the bars for raising and lowering the same, a latch mounted on one of the legs and arranged to engage the lever for holding the bars at the limit of their downward movement, and a spring connected with the lever for automatically raising the bars when the lever is released from the latch.

3. The combination with legs adapted to support a tub or other object, of radially arranged bars hinged at their outer ends to the legs and arranged to swing upward and downward and forming braces for the legs when at the limit of their downward movement, anti-friction devices carried by the bars and arranged to project beyond the lower ends of the legs when the bars are moved downward, a lever fulcrumed to one of the legs and guided by the opposite leg and connected at an intermediate point with the inner ends of the bars, and means for engaging the lever to lock the anti-friction devices in their extended position.

4. The combination with legs adapted to support a tub or other object, of radially arranged bars hinged at their outer ends to the legs and arranged to swing upward and downward and forming braces for the legs when at the limit of their downward movement, anti-friction devices carried by the bars and arranged to project beyond the lower ends of the legs when the bars are moved downward, a lever fulcrumed to one of the legs and guided by the opposite leg and connected at an intermediate point with the inner ends of the bars, a spring located above the lever and connected with the same for moving the bars upwardly, and a latch arranged in the path of and adapted to automatically engage the lever to lock the bars at the limit of their downward movement.

5. The combination with legs adapted to support a tub or other object, one of which is provided with a longitudinal slot, bars extending inwardly from the legs and movable upwardly and downwardly, anti-friction devices carried by the bars and arranged to project below the legs, a lever fulcrumed at one end to one of the legs and having its other end operating in the said slot, and a latch eccentrically pivoted to the slotted leg and arranged at an inclination and having its lower end extending across the slot to confine the lever in the lower portion thereof.

6. The combination with legs adapted to support a tub or other object, of bars connected at their outer ends with the lower portions of the legs and movable upwardly and downwardly, anti-friction devices carried by the bars and arranged to project below the legs, a pin having projecting wings loosely connected with the inner ends of the bars, and an operating lever connected with the pin and adapted to operate the said bars.

7. The combination with legs adapted to support a tub or other object, of bars hinged at their outer ends to the lower portions of the legs, anti-friction devices carried by the bars, a central pin having intersecting slots, crossed interlocking plates fitted in the slots and projecting beyond the pin and forming wings, means for loosely connecting the wings with the inner ends of the bars, and operating mechanism connected with the pin.

8. The combination with legs adapted to support a tub or other object, of bars hinged at their outer ends to the lower portions of the legs, a central member having a threaded upper portion and provided in its lower portion with intersecting slots, crossed plates secured in the slots and forming projecting wings, means for loosely connecting the wings with the inner ends of the bars, an operating lever having a slot receiving the upper portion of the central member, a nut mounted on the threaded portion of the member and retaining the lever thereon, and a spacing sleeve mounted on the member below the lever.

9. The combination with legs adapted to support a tub or other object, of bars hinged at their outer ends to the lower portions of the legs and provided in their inner ends with longitudinal slots, crossed plates extending into the slots of the bars and having inclined slots, pivots piercing the bars and operating in the inclined slots, a central member connecting the plates, and an operating lever carrying the central member.

10. The combination of legs adapted to support a tub or other object, crossed rods connecting the upper portions of the legs, bars hinged at their outer ends to the legs at the lower portions thereof and forming braces for the same, casters carried by the bars, an operating lever arranged above the bars and connected with the inner ends thereof for raising and lowering the same, and a spring hung from the rods and connected with the lever for raising the bars.

In testimony, that I claim the foregoing as my own, I have hereto affixed my signature in the presence of two witnesses.

WILLIAM WALLACE TERRIFF.

Witnesses:
 GEO. W. BURHANS,
 E. M. ALLEN.